US012611683B2

(12) United States Patent
Des Jardins et al.

(10) Patent No.: US 12,611,683 B2
(45) Date of Patent: Apr. 28, 2026

(54) JET CARTRIDGES FOR JETTING FLUID MATERIAL, AND RELATED METHODS

(71) Applicant: NORDSON CORPORATION, Westlake, OH (US)

(72) Inventors: Stephen R. Des Jardins, Encinitas, CA (US); Alan R. Lewis, Carlsbad, CA (US); Jared Wilburn, San Marcos, CA (US); Robert J. Wright, Carlsbad, CA (US)

(73) Assignee: Nordson Corporation, Westlake, OH (US)

( * ) Notice: Subject to any disclaimer, the term of this patent is extended or adjusted under 35 U.S.C. 154(b) by 949 days.

(21) Appl. No.: 17/177,401

(22) Filed: Feb. 17, 2021

(65) Prior Publication Data

US 2022/0212211 A1 Jul. 7, 2022

Related U.S. Application Data

(63) Continuation of application No. 14/730,522, filed on Jun. 4, 2015, now Pat. No. 10,953,413.

(51) Int. Cl.
*B05B 1/24* (2006.01)
*B05B 1/02* (2006.01)
(Continued)

(52) U.S. Cl.
CPC .................. *B05B 1/24* (2013.01); *B05B 1/02* (2013.01); *B05C 5/001* (2013.01); *B05C 5/0225* (2013.01); *B05C 11/1034* (2013.01)

(58) Field of Classification Search
CPC .. B05B 1/24; B05B 1/02; B05C 5/001; B05C 5/0225; B05C 11/1034
See application file for complete search history.

(56) References Cited

U.S. PATENT DOCUMENTS 2,460,861 A 2/1949 Walters
2,644,717 A 7/1953 Kopperschmidt
(Continued)

FOREIGN PATENT DOCUMENTS

CN 2542345 Y 4/2003
CN 102950081 A 3/2013
(Continued)

OTHER PUBLICATIONS

European Application No. 16172694.8: Extended European Search Report dated Feb. 11, 2016, 8 pages.

*Primary Examiner* — Steven M Cernoch
(74) *Attorney, Agent, or Firm* — BakerHostetler

(57) ABSTRACT

A jet cartridge for jetting fluid material includes a body adapted to receive fluid material, and a fluid passage defined within the body and extending along a longitudinal axis thereof. At least a portion of the fluid passage extends obliquely relative to the longitudinal axis. The body is adapted to receive heat from a heating element and to transfer the heat to the fluid material flowing through the fluid passage. A method of jetting fluid material with a jet dispenser including a jet cartridge includes receiving fluid material into the jet cartridge, directing the fluid material through the jet cartridge along a longitudinal axis thereof and obliquely relative to the longitudinal axis, heating the fluid material directed through fluid cartridge to a target temperature, maintaining the target temperature as the fluid material enters a nozzle, and jetting the heated fluid material through the nozzle.

20 Claims, 8 Drawing Sheets

(51) Int. Cl.

| | |
|---|---|
| ***B05C 5/00*** | (2006.01) |
| ***B05C 5/02*** | (2006.01) |
| ***B05C 11/10*** | (2006.01) |

(56) References Cited

U.S. PATENT DOCUMENTS

| | | | |
|---|---|---|---|
| 3,034,726 | A | 5/1962 | Peras |
| 4,212,425 | A | 7/1980 | Schlick |
| 4,708,289 | A | 11/1987 | Szablewski et al. |
| 4,812,326 | A | 3/1989 | Tsukazaki et al. |
| 4,827,961 | A | 5/1989 | Nitzberg et al. |
| 5,400,969 | A | 3/1995 | Keene |
| 5,598,974 | A | 2/1997 | Lewis et al. |
| 5,849,084 | A | 12/1998 | Hayes et al. |
| 5,984,147 | A | 11/1999 | Van Ngo |
| 6,042,028 | A | 3/2000 | Xu |
| 6,450,416 | B1 | 9/2002 | Berg et al. |
| 6,547,155 | B2 | 4/2003 | Crane |
| 6,666,387 | B2 | 12/2003 | Kubo |
| 6,962,492 | B2 | 11/2005 | Olaru et al. |
| 7,198,555 | B2 | 4/2007 | Dodge |
| 8,220,725 | B2 | 7/2012 | Gressett et al. |
| 8,708,246 | B2 | 4/2014 | Dunlap et al. |
| 9,808,826 | B2 | 11/2017 | Aguilar et al. |
| 10,953,413 | B2 | 3/2021 | des Jardins et al. |
| 2003/0082263 | A1 | 5/2003 | Olaru |
| 2005/0161477 | A1 | 7/2005 | Strecker et al. |
| 2010/0181337 | A1 | 7/2010 | Ikushima |
| 2013/0048759 | A1 | 2/2013 | Aguilar et al. |
| 2013/0087633 | A1 | 4/2013 | Fukanuma |
| 2014/0191057 | A1 | 7/2014 | Eames et al. |
| 2017/0050198 | A1 | 2/2017 | Ohno et al. |

FOREIGN PATENT DOCUMENTS

| | | | |
|---|---|---|---|
| EP | 2561932 | A2 | 2/2013 |
| JP | 08-238447 | A | 9/1996 |
| JP | 2013-046906 | A | 3/2013 |
| JP | 2015-080768 | A | 4/2015 |
| TW | 201323093 | A | 6/2013 |

JET CARTRIDGES FOR JETTING FLUID MATERIAL, AND RELATED METHODS

CROSS REFERENCE TO RELATED APPLICATIONS

This application is a continuation of U.S. patent application Ser. No. 14/730,522, filed Jun. 4, 2015, the disclosure of which is hereby incorporated by reference as if set forth in its entirety herein.

TECHNICAL FIELD

The present invention relates generally to fluid dispensers, and more particularly, to fluid dispensers for jetting fluid material.

BACKGROUND

Liquid dispensers for jetting fluid materials, such as epoxy, silicones, and other adhesives, are known in the art. Jet dispensers generally operate to dispense small volumes of fluid material to a substrate by rapidly impacting a valve seat with a valve member to create a distinct, high pressure pulse that ejects a small volume, or droplet, of fluid material from the nozzle of the dispenser, which flies from the nozzle through the air to impact a surface, or substrate, onto which the fluid material is being applied. Known jet cartridges used with jet dispensers include a cartridge body that houses the valve member and a nozzle, the cartridge body being adapted to couple to an actuator of the jet dispenser.

In applications for jetting heated fluid material, a heating element is coupled to the cartridge body, which then transfers heat to the fluid material as it flows through the internal passages of the jet cartridge. The viscosity of the fluid material may be temperature-dependent. Accordingly, the viscosity of the fluid material may be controlled by transferring heat to the fluid material as it flows through the jet cartridge, particularly in applications in which a low viscosity of the fluid material is desired.

In order to achieve uniform fluid flow characteristics and dispense weight repeatability, it is desirable to maintain a uniform, consistent temperature of the fluid material as it flows through the jet cartridge and into the nozzle for jetting. However, known heated jet cartridges fail to maintain a uniform temperature of the fluid material as the fluid material flows through the jet cartridge and into the nozzle. In particular, the fluid material is often exposed to heat for an insufficient length of time within the jet cartridge such that the fluid material experiences a drop in temperature (i.e., partially cools) by the time it reaches the nozzle. As a result, the fluid material flowing toward the nozzle experiences inconsistent temperatures and viscosities, thereby resulting in imprecise dispensing performance.

Known heated jet cartridges are further deficient in that many are not designed to be disassembled, and later reassembled, to fully expose the internal fluid passages for inspection and cleaning between uses. Alternatively, known heated jet cartridges that are disassembleable often require the assistance of an external tool, such as a wrench or a screw driver, for disengaging one or more tightened mechanical fasteners. Accordingly, exposure of the internal fluid passages of known jet cartridges for adequate inspection and cleaning is made difficult, if not impossible. In this regard, blind fluid paths and "dead zones" within jet cartridges, which may undesirably trap fluid during use and hinder fluid flow, may be insufficiently accessible for proper inspection and cleaning.

Therefore, a need exists for improvements to known jet cartridges for jet dispensers.

SUMMARY

In accordance with one embodiment, a jet cartridge for jetting fluid material includes a body adapted to receive fluid material, and a fluid passage defined within the body and extending along a longitudinal axis thereof. At least a portion of the fluid passage extends obliquely relative to the longitudinal axis. Additionally, the body is adapted to receive heat from a heating element and to transfer the heat to the fluid material flowing through the fluid passage.

In accordance with another embodiment, a method is provided for jetting fluid material with a jet dispenser including an actuator and a jet cartridge operatively coupled to the actuator and having a nozzle. The method includes receiving fluid material into the jet cartridge, and directing the fluid material through the jet cartridge along a longitudinal axis thereof and obliquely relative to the longitudinal axis, in a direction toward the nozzle. The method further includes heating the fluid material directed through the jet cartridge to a target temperature, and maintaining the target temperature as the fluid material enters the nozzle. The method further includes jetting the heated fluid material through the nozzle.

In accordance with another embodiment, a jet cartridge for jetting fluid material includes an outer body, a flow insert received within the outer body, a fluid passage defined between the outer body and the flow insert, and a frictional connection between the outer body and the flow insert. The frictional connection is facilitated by a releasable sealing element disposed between the outer body and the flow insert, and is adapted to be disengaged for exposing the fluid passage without use of an independent tool. Additionally, the outer body is adapted to receive heat from a heating element and to transfer the heat to the fluid material flowing through the fluid passage.

Various additional features and advantages of the invention will become more apparent to those of ordinary skill in the art upon review of the following detailed description of the illustrative embodiments taken in conjunction with the accompanying drawings.

DETAILED DESCRIPTION

Figure 1:
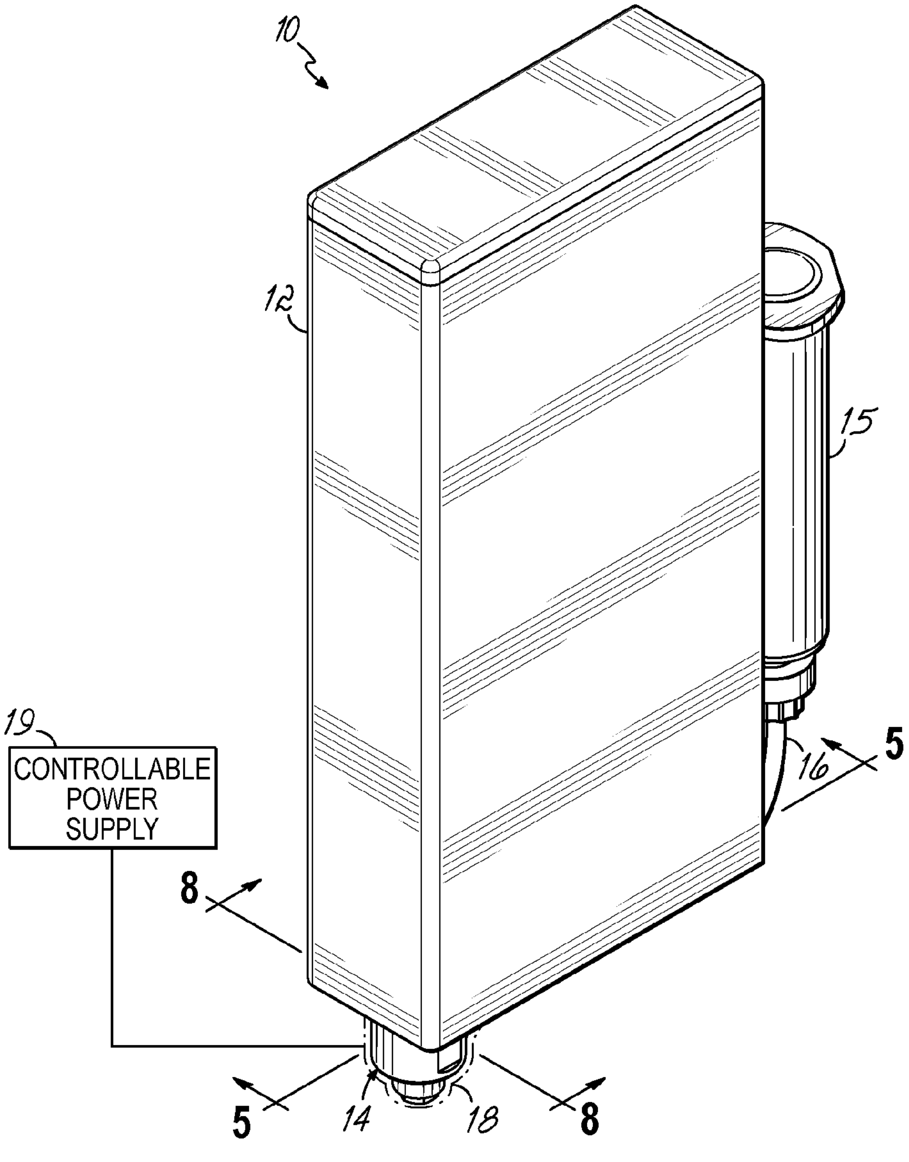
FIG. 1 is a perspective view of a jet dispenser including a jet cartridge according to an embodiment of the invention.

Referring to FIG. 1, a jet dispenser 10 in accordance with an embodiment of the invention is shown. The jet dispenser 10 includes an actuator 12, a jet cartridge 14 operatively coupled to the actuator 12, and fluid reservoir 15 adapted to supply fluid material to the jet cartridge 14 through a fluid feed tube 16. The fluid material may include various heat-sensitive fluid materials, such as epoxy, silicone, or other adhesives having a temperature-dependent viscosity. The jet dispenser 10 further includes a heating element 18, shown in phantom, powered by a controllable power supply 19 for heating the jet cartridge 14 and fluid material flowing through the jet cartridge 14 to maintain an optimal temperature and viscosity of the fluid material during dispense. As described in greater detail below, the actuator 12 is operable to actuate a valve member within the jet cartridge 14 to "jet" or "eject" fluid material from the jet cartridge 14 onto a substrate.

Figure 2:
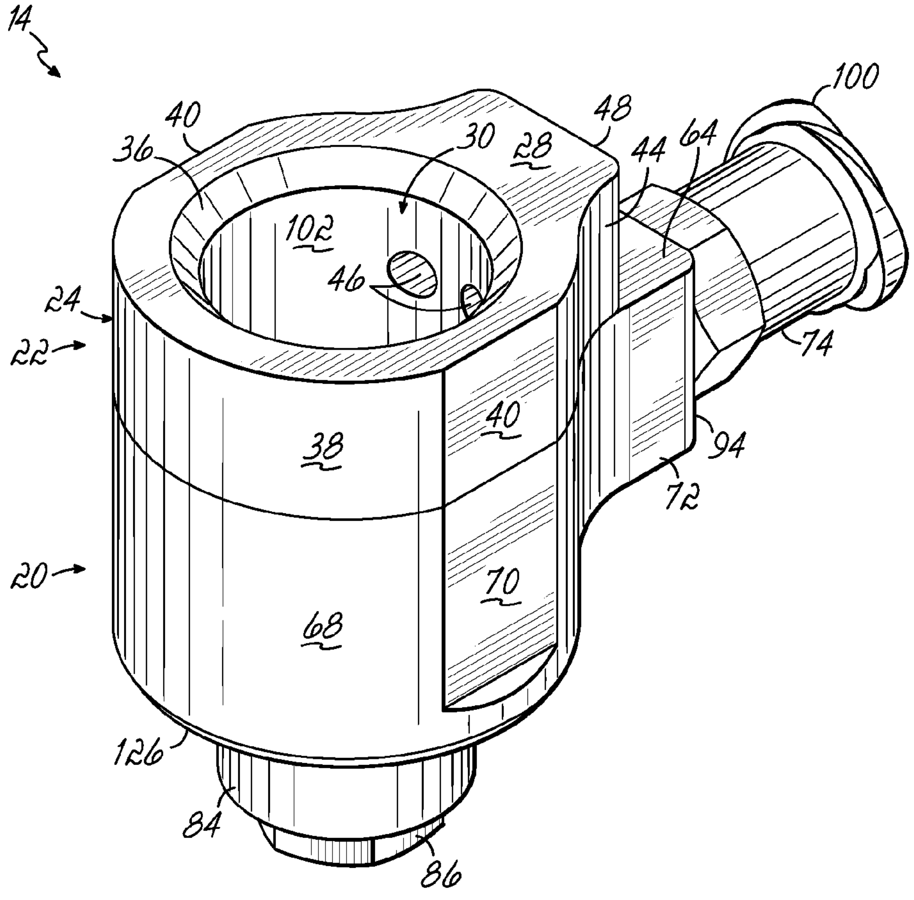
FIG. 2 is a front perspective view of the jet cartridge of FIG. 1, including a cartridge body and a flow insert.
Figure 3:
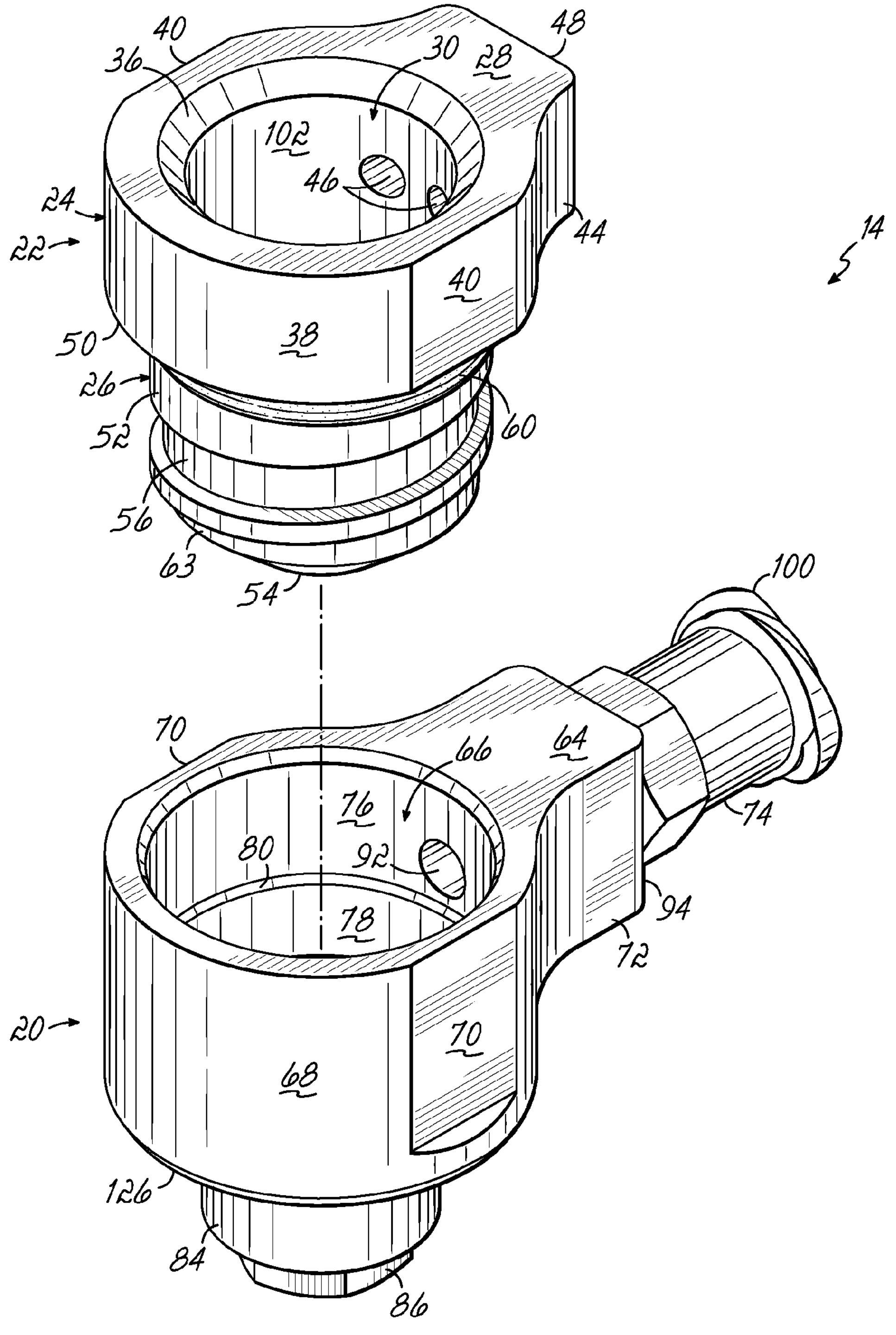
FIG. 3 is a front perspective similar to FIG. 2, showing the flow insert removed from the cartridge body.
Figure 4:
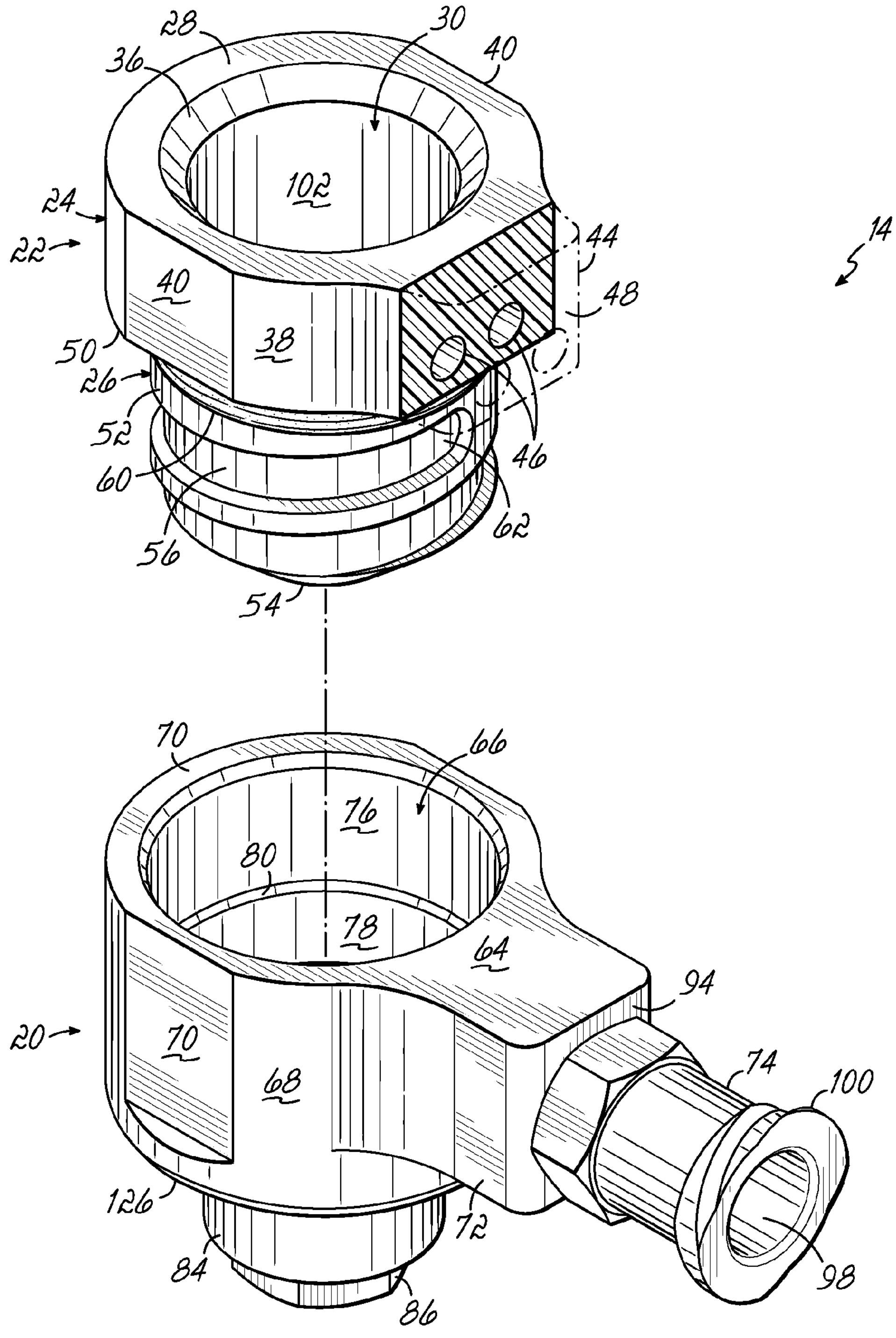
FIG. 4 is a rear perspective view of the jet cartridge of FIG. 1, showing the flow insert removed from the cartridge body, and showing a cross-section of an extension portion of the flow insert.

Referring to FIGS. 2-4, detailed structural features of the jet cartridge 14 are shown. In general, the jet cartridge 14 includes an outer cartridge body 20 and a flow insert 22 removably received within the outer cartridge body 20, such that the flow insert 22 and the outer cartridge body 20 define a fluid passage therebetween, as described in greater detail below in connection with FIGS. 5-7. The outer cartridge body 20 and flow insert 22 may be formed of any suitable heat-resistant material, such as 303 stainless steel for example.

The flow insert 22 includes an insert head 24 and an insert shaft 26 extending axially from the insert head 24. The insert head 24 includes a planar upper surface 28 and an actuator socket 30 extending through the upper surface 28. The actuator socket 30 is sized and shaped to receive a driving portion 32 of the actuator 12 having a drive pin 34, as shown best in FIGS. 5 and 6. The actuator socket 30 may include a lead-in chamfer 36 at an upper edge thereof to assist in aligning the jet cartridge 14 with the actuator 12 during assembly. The insert head 24 further includes a contoured side surface 38 having a pair of diametrically opposed flat faces 40, and extending radially outward to define an extension portion 44 of the insert head 24. The extension portion 44 may include one or more radially extending fluid leak passages 46 that open to the actuator socket 30 at one end, and to an outer face 48 of the extension portion 44 at an opposite end.

Figure 5:
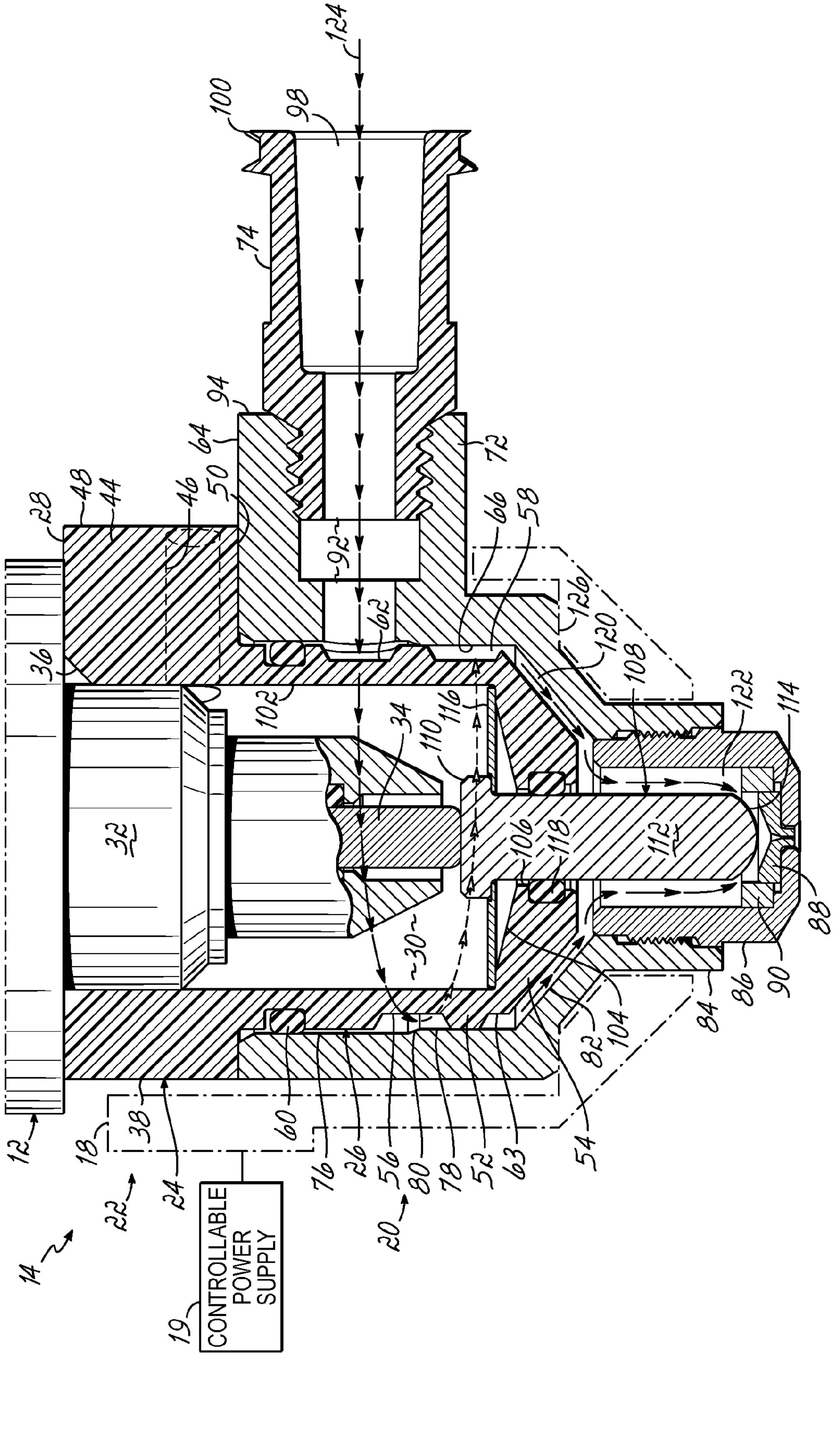
FIG. 5 is a side cross-sectional view taken along line 5-5 of the jet cartridge of FIG. 1 coupled to an actuator of the jet dispenser, showing flow of fluid material through the jet cartridge.
Figure 6:
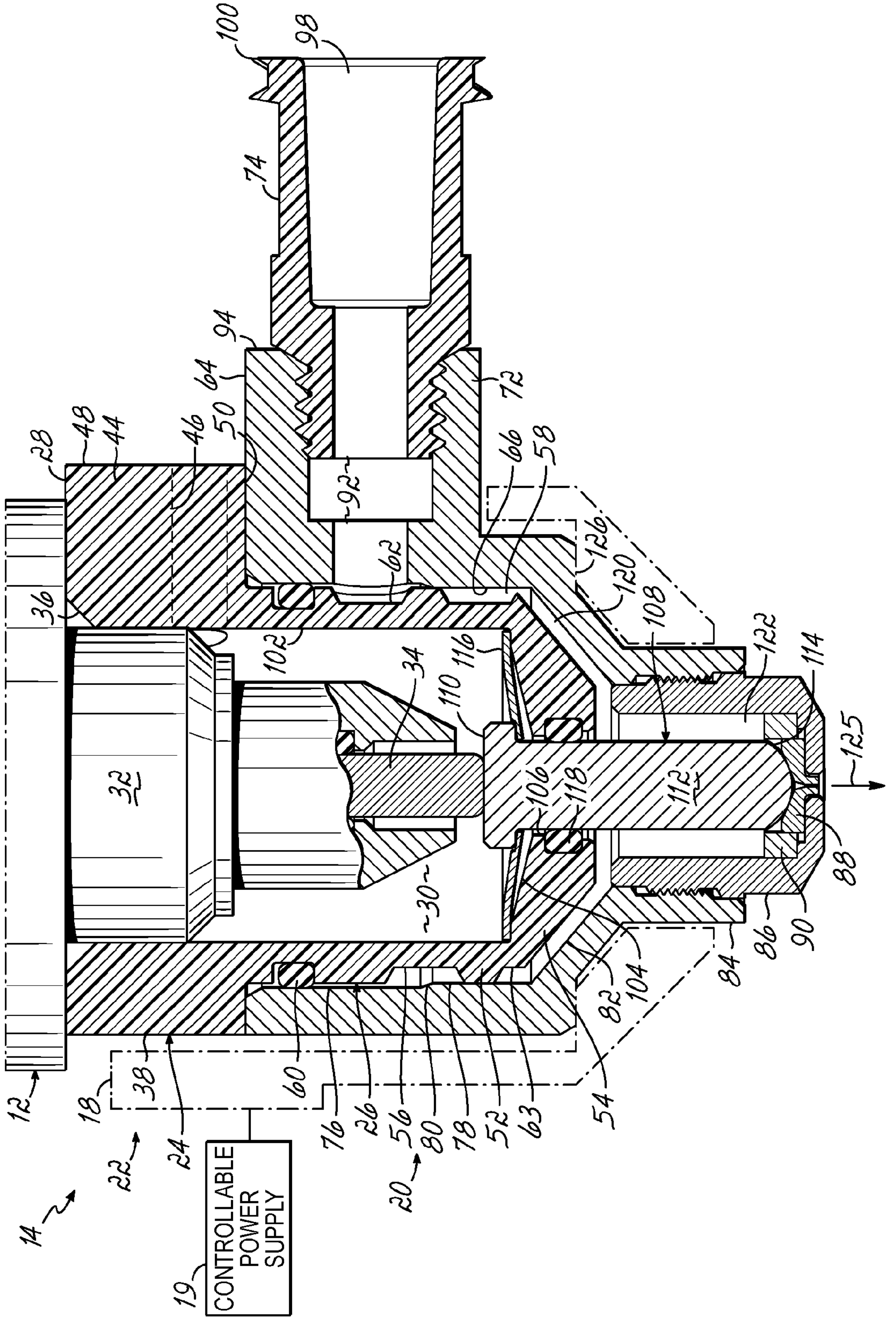
FIG. 6 is a side cross-sectional view similar to FIG. 5, showing the fluid material being jetted through a nozzle.

The insert shaft 26 extends axially from a lower surface 50 of the insert head 24, and includes a cylindrical shaft portion 52 and a tapered end 54, as shown best in FIGS. 5 and 6. The cylindrical shaft portion 52 includes a fluid passage groove 56 extending circumferentially about a periphery of the cylindrical shaft portion 52 to at least partially define a main fluid passage 58. As described below, the fluid passage groove 56 and resultant main fluid passage 58 may be helical in shape, for example. An upper sealing element 60, such as an o-ring, may be received within a seal groove positioned between the lower surface 50 of the insert head 24 and the fluid passage groove 56.

As shown in FIGS. 3 and 4, the fluid passage groove 56 includes an inlet end 62, which may be rounded and chamfered, and may extend helically along a longitudinal axis of the flow insert 22 toward an outlet end 63 proximate the tapered end 54 of the insert shaft 26. As shown, the longitudinal axis of the flow insert 22 is aligned coaxially with the longitudinal axis of the outer cartridge body 20, thereby defining a single, common longitudinal axis for the jet cartridge 14. The fluid passage groove 56 may extend for at least one full revolution (e.g., 360 degrees) about the longitudinal axis of the flow insert 22. In alternative embodiments, the fluid passage groove 56 may extend for greater than one full revolution (e.g., greater than 360 degrees), for example a plurality of revolutions, or for less than one full revolution (e.g., less than 360 degrees), about the longitudinal axis. Additionally, the fluid passage groove 56 may alternatively be formed on the inner surfaces 76, 78 of the outer cartridge body 20 rather than on the flow insert 22, or in combination with being formed on the flow insert 22.

The helically-shaped fluid passage groove 56 may be formed with an axial width that remains substantially constant along an upper portion of the helical groove 56, and which then tapers as the fluid passage groove 56 approaches the outlet end 63. Additionally, the fluid passage groove 56 may be formed with a radial width that remains substantially constant along an entire length of the fluid passage groove 56. It will be appreciated that the helically-shaped fluid passage groove 56 may be formed with any suitable axial width, radial depth, pitch, and quantity of helical revolutions to achieve optimal flow characteristics in any desired application. In one embodiment, the fluid passage groove 56 may be formed with a pitch of approximately 3.5 mm.

While the fluid passage groove 56 is shown and described herein as being helical in shape in connection with the illustrated exemplary embodiment, it will be appreciated that various alternative shapes of the fluid passage groove 56 may also be provided. For example, the fluid passage groove 56 may be formed with any suitable spiral shape that extends along (e.g., parallel to) and circumferentially about the longitudinal axis of the flow insert 22. The one or more revolutions of such spiral shapes may define one or more angles relative to the longitudinal axis of the flow insert 22, such that the spiral may be non-helical, and may define one or more diameters of the spiral about the longitudinal axis. In this regard, it will be understood that the term "spiral," as used herein, encompasses any three-dimensional path extending parallel to and circumferentially about the longitudinal axis of the flow insert 22. Furthermore, it will be understood that a "spiral" path is not limited in shape to a path defining a constant angle relative to the longitudinal axis, nor to a path defining a constant or uniformly changing diameter about the longitudinal axis.

More generally, the fluid passage groove 56 may be shaped so as to define any path that extends along (e.g., parallel to) the longitudinal axis of the flow insert 22, as demonstrated by the helically-shaped fluid passage groove 56, and having at least one portion that extends obliquely relative to the longitudinal axis. In other words, having at least one portion that extends obliquely relative to the longitudinal axis and having at last one portion of the fluid passage groove 56 that defines a directional path which traverses across the longitudinal axis and is neither directly parallel to nor directly perpendicular to the longitudinal axis in a plane spaced from the longitudinal axis (e.g., a plane tangent to the outer surface of the cylindrical shaft portion 52). For example, each revolution of the helically-shaped fluid passage groove 56, when viewed head-on from a side view as shown in FIGS. 3 and 5, is obliquely angled relative to the longitudinal axis of the flow insert 22 such that the fluid passage groove 56 continuously advances along the longitudinal axis while simultaneously traversing across the longitudinal axis. As such, the oblique revolution is not confined to purely parallel and/or perpendicular directions relative to the longitudinal axis of the flow insert 22.

It will be appreciated that the fluid passage groove 56 may be formed with various alternative shapes, other than helical and spiral, that extend along the longitudinal axis of the flow insert 22 and which include at least one portion that extends obliquely relative to the longitudinal axis, as understood in view of the description provided above. For example, though not shown, the fluid passage groove 56 may define a zig-zag-like pattern that weaves back and forth across the longitudinal axis to define one or more obliquely extending segments that are axially spaced from one another. Additionally, the fluid passage groove 56, in whole or in part, may extend fully circumferentially about (i.e., at least 360 degrees) the longitudinal axis of the flow insert 22, or only partially circumferentially about the longitudinal axis of the flow insert 22 (i.e., less than 360 degrees).

The outer cartridge body 20 is in the form of a heat-transferring shell having a planar upper surface 64 and an insert socket 66 extending through the upper surface 64 and being sized and shaped to receive the insert shaft 26 of the flow insert 22. The outer cartridge body 20 includes a contoured side surface 68 having a pair of diametrically opposed flat faces 70, and extending radially outward to define an extension portion 72 of the outer cartridge body 20. As shown in FIG. 2, the side surface 38 and extension portion 44 of the flow insert 22 substantially align with the side surface 68 and extension portion 72 of the outer cartridge body 20 when the flow insert 22 and the outer cartridge body 20 are coupled together. A fluid fitting 74 may be coupled to the extension portion 72 for receiving a flow of fluid material from the fluid reservoir 15, as described below.

Referring to FIGS. 3-6, additional structural features of the jet cartridge 14 will now be described. The insert socket 66 of the outer cartridge body 20 includes a cylindrical portion defined by an upper cylindrical face 76 and a lower cylindrical face 78 having a diameter slightly smaller than that of the upper cylindrical face 76. An angled annular shoulder 80 is defined between the upper and lower cylindrical faces 76, 78. The insert socket 66 further includes a tapered portion defined by a lower tapered face 82 extending from the lower cylindrical face 78. The cartridge body 20 further includes a lower collar 84 that receives a nozzle hub 86, for example through threaded engagement. The nozzle hub 86 houses a nozzle 88 that is secured in place by a nozzle retainer 90 positioned between an outer circumference of the nozzle 88 and inner circumference of the nozzle hub 86. The retainer 90 may be comprised of epoxy that bonds and seals the nozzle 88 against the nozzle hub 86, for example.

As shown best in FIGS. 5 and 6, the extension portion 72 of the outer cartridge body 20 includes a fluid inlet passage 92 extending radially through an outer face 94 thereof and opening to the insert socket 66. The fluid inlet passage 92 includes a threaded bore for receiving the fluid fitting 74 in threaded engagement. The fluid fitting 74 defines a fluid inlet 98 that communicates with the fluid inlet passage 92, and includes an outer thread 100 for coupling to the fluid feed tube 16 for directing fluid material from the fluid reservoir 15 into the jet cartridge 14 for jetting, as described in greater detail below.

The actuator socket 30 of the flow insert 22 extends through the insert head 24 and the cylindrical shaft portion 52 of the insert shaft 26, as shown in FIGS. 5 and 6. The actuator socket 30 includes a cylindrical portion defined by a cylindrical face 102, and a tapered portion defined by a tapered face 104. The cylindrical portion is sized and shaped to receive the driving portion 32 of the actuator 12. The flow insert 22 further includes a lower aperture 106 extending through the tapered end 54 of the insert shaft 26 and opening to the insert socket 66.

A valve member 108 including a valve head 110 and a valve stem 112 having a stem tip 114 is supported by the flow insert 22 with a spring washer 116. The spring washer 116 may be supported at an upper end of the tapered face 104 and includes a central aperture through which the valve stem 112 is received such that the valve head 110 abuts the spring washer 116. The valve stem 112 extends through the lower aperture 106 of the flow insert 22 and is sealingly engaged by an annular valve seal 118. As described in greater detail below, the valve member 108 may be rapidly actuated between an upward position and a downward position to eject material through the nozzle 88.

During assembly, the flow insert 22 is aligned with the outer cartridge body 20 in the manner generally shown in FIGS. 3 and 4. In particular, the insert shaft 26 is aligned coaxially with the insert socket 66, and the side surface 38 of the flow insert 22 is aligned with the side surface 68 of the cartridge body 20. The insert shaft 26 is then removably received within the insert socket 66 in the manner shown in FIGS. 1, 5, and 6. In particular, the lower surface 50 of the flow insert 22 is supported by the upper surface 64 of the outer cartridge body 20. Additionally, the upper sealing element 60 of the flow insert 22 sealingly and releasably engages the upper cylindrical face 76 of the cartridge body 20, thereby establishing a frictional connection between the outer cartridge body 20 and the flow insert 22. As shown in the illustrated exemplary embodiment, the flow insert 22 is not otherwise coupled to the outer cartridge body 20 with any mechanical fasteners, such as threaded fasteners. Thus, the flow insert 22 may be easily disassembled from the outer cartridge body 20 by simply disengaging the frictional connection by hand. As such, no independent tools (e.g., wrench or screwdriver) are required to disassemble the flow insert 22 from the cartridge body 20. Consequently, and advantageously, the flow insert 22 is releasably, or removably, coupled to the cartridge body 20 such that these components may be quickly and easily disassembled by hand to thereby expose the confronting surfaces of the flow insert 22 and cartridge body 22 for inspection and cleaning purposes.

When the flow insert 22 is received by the outer cartridge body 20 as shown, the cylindrical shaft portion 52 of the insert shaft 26, including the fluid passage groove 56, confronts the upper and lower cylindrical faces 76, 78 of the insert socket 66. In this manner, the fluid passage groove 56 and the upper and lower cylindrical faces 76, 78 collectively define the main fluid passage 58 between the flow insert 22 and the outer cartridge body 20. As shown in the exemplary embodiment illustrated herein, the fluid passage groove 56 and main fluid passage 58 may be helical in shape. However, as described above, the fluid passage groove 56 may be formed with various alternative shapes to thereby define a variety of corresponding alternatively shaped main fluid passages 58, such as a non-helical spiral fluid passage for example. The inlet end 62 of the fluid passage groove 56 is aligned directly with the fluid inlet passage 92 such that the fluid inlet passage 92 communicates with the main fluid passage fluid passage 58.

The tapered end 54 of the insert shaft 26 is suspended above the lower tapered face 82 of the insert socket 66, thereby defining an annular tapered fluid chamber 120 that communicates at an upper end with the main fluid passage 58 and at a lower end with a lower fluid chamber 122 defined by the nozzle hub 86. As shown, the valve stem 112 extends into the lower fluid chamber 122 and is suspended above the nozzle 88.

As indicated by the directional arrows in FIG. 5, the fluid inlet 98, fluid inlet passage 92, main fluid passage 58, tapered fluid chamber 120, and lower fluid chamber 122 collectively define a fluid flow path 124 through the jet cartridge 14, along which fluid material is directed. Accordingly, during operation, the flow insert 22 functions as a baffle for directing fluid material, received through the fluid inlet passage 92, toward the nozzle 88 for jetting.

The assembled jet cartridge 14 is coupled to the actuator 12 of the jet dispenser 10 such that the driving portion 32 is received within the actuator socket 30 and the drive pin 34 abuts the valve head 110. As described below, the actuator 12 is operable to rapidly actuate the drive pin 34 downward (see FIG. 6) and upward (see FIG. 5) to thereby actuate the valve member 108 for ejecting fluid material through the nozzle 88.

Figure 8:
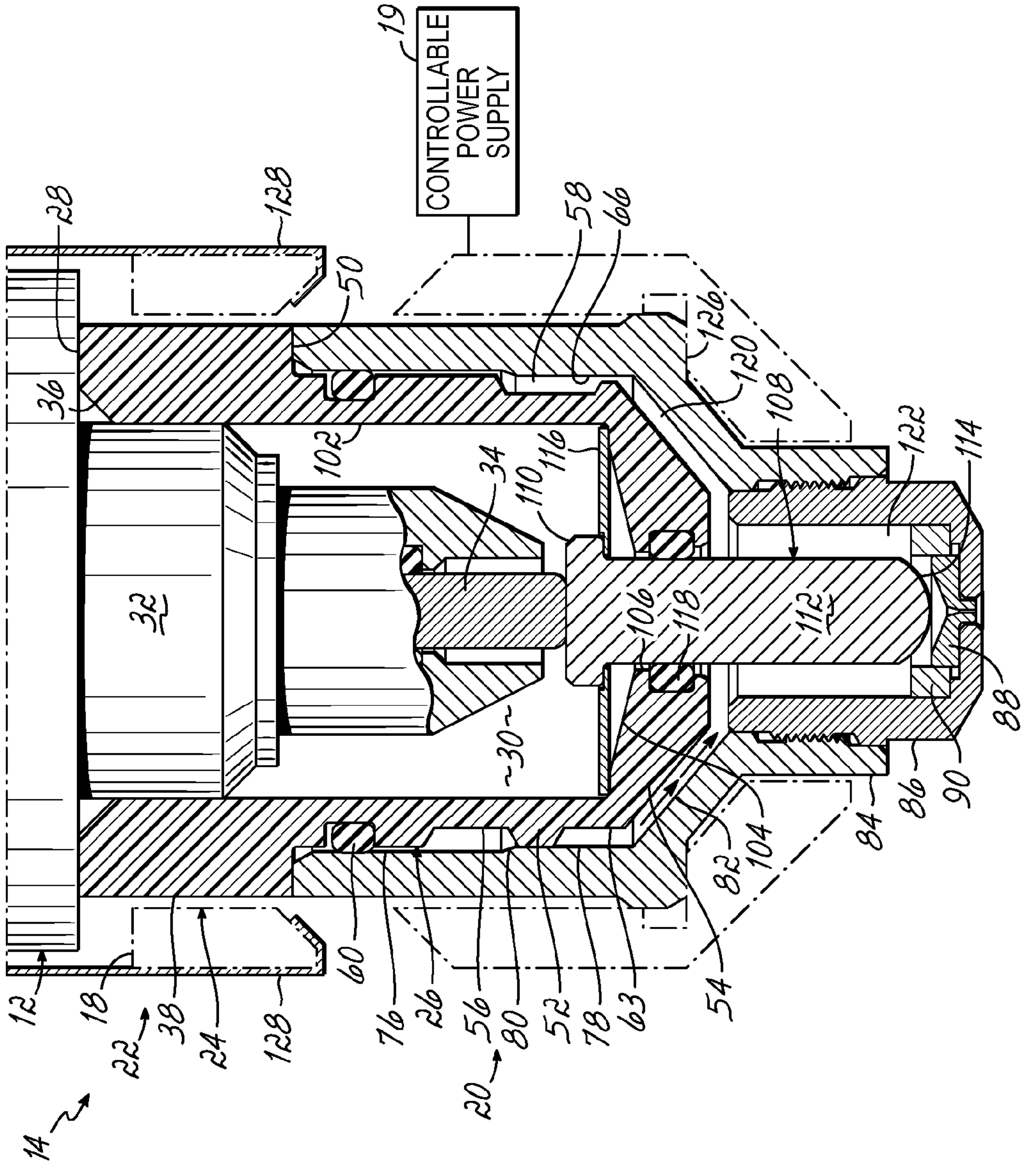
FIG. 8 is a front cross-sectional view taken along line 8-8 of the jet cartridge of FIG. 1, showing details of a clamp coupling the jet cartridge to the actuator of the jet dispenser.

The heating element 18, shown in phantom herein, is releasably coupled to and surrounds a periphery of the outer cartridge body 20, such that the heating element 18 directly contacts at least a lower annular shoulder 126 of the outer cartridge body 20. In alternative embodiments, the heating element 18 may directly contact other portions of the outer cartridge body 20 as well. As best shown in FIG. 8, the assembled jet cartridge 14 may be releasably coupled to the actuator 12 via the heating element 18 and a clamp 128 having arms that extend around and releasably engage an upper portion of the heating element 18 and a lower portion of the actuator 12. In this manner, the clamp 128 may hold the heating element 18, the outer cartridge body 20, and the flow insert 22 in axial compression against the actuator 12, and may be easily disengaged from the jet cartridge 14 by hand without use of an independent tool (e.g., wrench or screwdriver). In alternative embodiments, any other suitable mechanical fastening device may be used.

The heating element 18 is energized by power supply 19 to heat the outer cartridge body 20, which then transfers heat to the fluid material flowing along the fluid flow path 124, as described in greater detail below. The power supply 19 is controllable to provide the heating element 18 with a suitable degree of electrical power for achieving any desired heating effect of the cartridge body 20 and the fluid material flowing along the fluid path 124. For example, the power supply 19 may be controlled dynamically during operation of the jet dispenser 10 to adjust a temperature, and thus a resultant viscosity, of the fluid material being jetted. The heating element 18 and/or the jet cartridge 14 may include one or more thermal sensors (not shown) for sensing a temperature of the outer cartridge body 20 and/or a temperature of the fluid material flowing along the fluid flow path 124. The power supply 19 may then be selectively controlled in response to temperatures sensed by the thermal sensors in order to achieve or otherwise maintain a target temperature of the outer cartridge 20 and/or the fluid material flowing along the fluid flow path 124.

Figure 7:
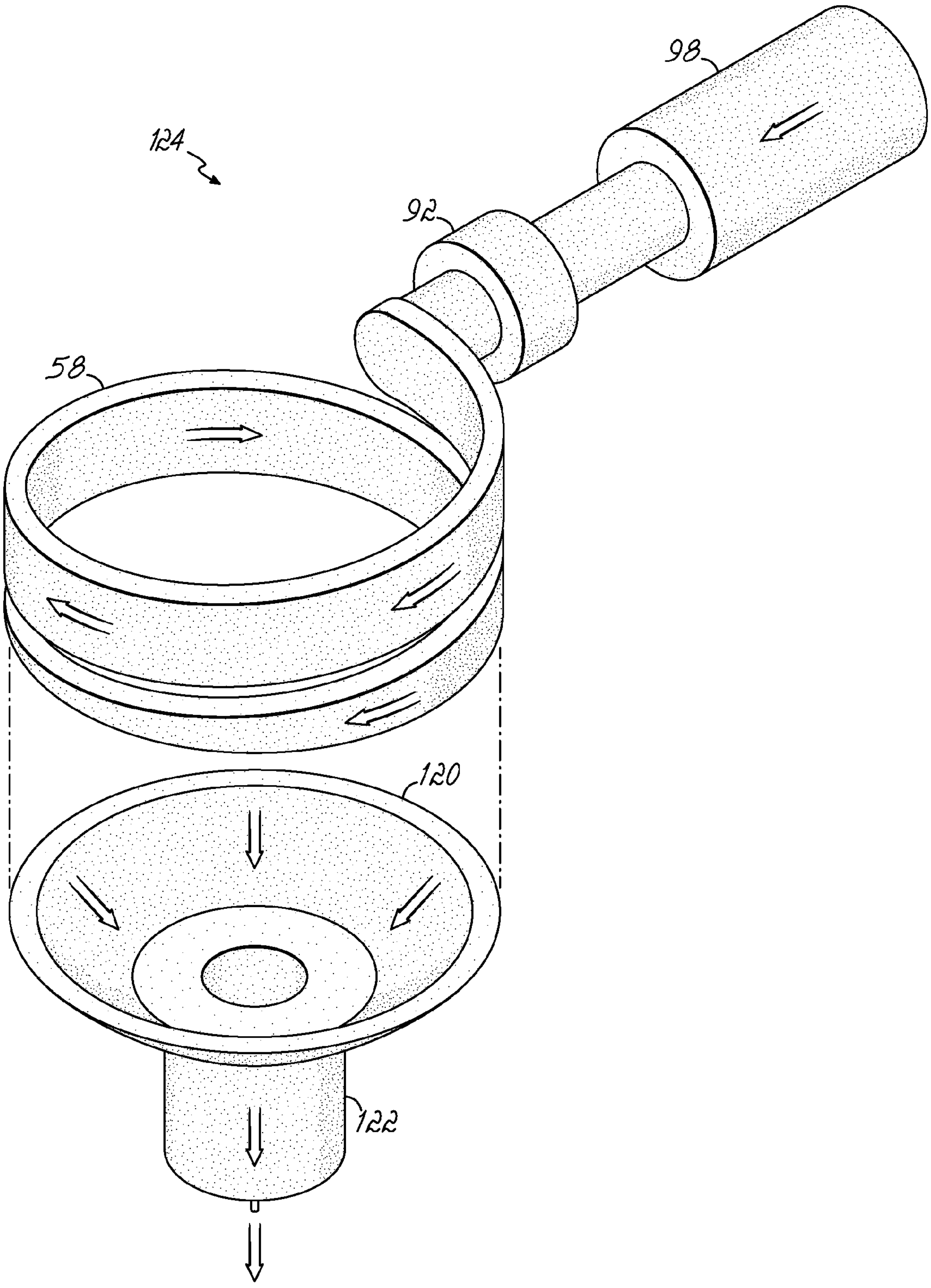
FIG. 7 is a schematic view of a fluid flow path, including a main fluid passage, of fluid material directed through the jet cartridge of FIG. 1.

Referring to FIGS. 5-7, operation of the jet dispenser 10, including the jet cartridge 14, will now be described in greater detail. FIG. 5 shows the drive pin 34 and valve member 108 in upward positions. Fluid material is directed into the fluid inlet 98 of the fluid fitting 74 from the fluid reservoir 15 through the fluid feed tube 16. The fluid material then passes through the fluid inlet passage 92 and into the main fluid passage 58 defined between the flow insert 22 and the outer cartridge body 20. The releasable seal established between the flow insert 22 and the cartridge body 20 by the upper sealing element 60 aids in containing the fluid material within the main fluid passage 58. The fluid material flows from the main fluid passage 58, through the tapered fluid chamber 120, and into the lower fluid chamber 122 in which the fluid material generally fills the region between the valve stem tip 114 and the nozzle 88. As described below in connection with FIG. 6, the fluid material is then jetted out through the nozzle 88 by the valve stem tip 114, as indicated by fluid ejection arrow 125.

FIG. 7 shows a schematic representation of the fluid flow path 124, including a helically-shaped main fluid passage 58. The dot-dashed lines shown in FIG. 7 demonstrate that the outer cartridge body 20 and the flow insert 22, including the fluid passage groove 56, may be formed with any suitable axial dimensions so as to define a main fluid passage 58 extending axially for any suitable length and having any suitable number of revolutions about the longitudinal axis of the flow insert 22.

As the fluid material flows through the main fluid passage 58 and into the tapered fluid chamber 120 toward the nozzle 88, the fluid material is forced into contact with the inner surfaces of the outer cartridge body 20. Heat generated by the heating element 18 is transferred to the outer cartridge body 20 through the annular shoulder 126, and from the outer cartridge body 20 to the fluid material flowing along the fluid flow path 124. Accordingly, the outer cartridge body 20 functions as a heat exchanger. More specifically, heat is transferred through the upper and lower cylindrical faces 76, 78 of the outer cartridge body 20 to fluid material flowing through the main fluid passage 58, and through the lower tapered face 82 to fluid material flowing through the tapered fluid chamber 120. Heat from the heating element 18 may also be transferred through the lower collar 84 and through the nozzle hub 86 to fluid material within the lower fluid chamber 122. In this manner, fluid material flowing through the jet cartridge 14 may be heated along substantially an entire portion of the fluid flow path 124, including at least the main fluid passage 58 and the tapered fluid chamber 120. As described above, the temperature to which the fluid material is heated may be selectively adjusted during dispensing operations via control of the power supply 19 that energizes the heating element 18.

Referring to FIG. 6, the actuator 12 is operable to rapidly actuate the drive pin 34 and the valve member 108 into downward positions in which the valve stem tip 114 forcibly contacts a valve seat defined on the nozzle 88, thereby forcing (i.e., jetting) heated fluid material out through the nozzle 88, as indicated by fluid ejection arrow 125. The drive pin 34 is then raised and the valve member 108 is returned to its upward position by a spring force provided by the spring washer 116. Fluid material continues to flow along the heated fluid flow path 124 toward to the nozzle 88, in the manner generally described above, and the valve member 108 may be rapidly actuated by the drive pin 34 between its upward and downward positions for further jetting. During jetting, any fluid material that seeps upward past the valve seal 118 into actuator socket 30 may is directed out through the fluid leak passages 46 in order to prevent fluid entry into the actuator 12.

Advantageously, the main fluid passage 58, whether helical, spiral, or otherwise in shape, contributes in defining a heated fluid path having a length sufficient to expose the fluid material to heat for a period of time sufficient to establish and substantially maintain a uniform target fluid temperature within the fluid cartridge 14, including at the nozzle 88. Consequently, a substantially consistent and uniform target viscosity of the fluid material may be maintained throughout the jet cartridge 14 as the fluid material flows toward and into the nozzle 88 for jetting. As a result, undesirable decreases in temperature of the fluid material at the nozzle 88 prior to and during jetting are substantially prevented, thereby improving dispense weight repeatability and enabling jetting with high fluid flow rates for high throughput applications.

Additional benefits are also provided by the configuration of the jet cartridge 14 shown and described herein. For example, the releasability of the fluid-tight seal established between the flow insert 22 and the outer cartridge body 20 by the upper sealing element 60 facilitates easy disassembly and reassembly of the flow insert 22 and the outer cartridge body 20 without use of an independent tool. Accordingly, all fluid-contacting portions of the outer cartridge body 20 and flow insert 22 may be quickly and easily exposed for comprehensive inspection, cleaning, and maintenance between uses. In particular, the fluid passage groove 56 formed on the flow insert 22 and the inner faces 76, 78, 82 of the outer cartridge body 20 are readily accessible upon disassembly, and thus may be easily inspected, cleaned, and maintained. Furthermore, the shape of the fluid passage groove 56 provides a single, continuous fluid passage 58 that enables a substantially constant and steady flow of fluid material toward the nozzle 88 without generating "dead flow zones" in which fluid flow would become hindered and form blockages, and without causing air entrapment along the fluid flow path 124.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A method of jetting fluid material with a jet dispenser including an actuator and a jet cartridge operatively coupled to the actuator and having a nozzle, the jet cartridge having an outer body and a flow insert received into the outer body, the method comprising:

receiving fluid material into a fluid passage in the jet cartridge, the fluid passage being defined between the outer body and the flow insert;

directing the fluid material through the jet cartridge along a longitudinal axis thereof in a direction toward the nozzle;

heating the fluid material directed through the jet cartridge to a target temperature;

maintaining the target temperature as the fluid material enters the nozzle; and jetting heated fluid material through the nozzle, wherein the fluid passage extends about and along a longitudinal axis of the outer body between a cylindrical face within the outer body and a periphery of the flow insert with a helical shape and/or a spiral shape.

2. The method of claim 1, wherein directing the fluid material through the fluid passage includes directing the fluid material peripherally about at least a helically-shaped fluid passage groove of the flow insert.

3. The method of claim 1, wherein heating the fluid material directed through the jet cartridge includes directly contacting the outer body with a heating element and energizing the heating element with a power supply to transfer heat to the fluid material in a helically-shaped fluid passage groove of the flow insert, and maintaining the target temperature of the fluid material includes selectively controlling the power supply.

4. The method of claim 3, further comprising configuring the flow insert with an insert shaft to be removably received within an insert socket of the outer body such that the flow insert and the outer body define the fluid passage therebetween, wherein the heating element is an electrical heating element, the electrical heating element directly contacting the outer body and being releasably coupleable to a jet dispenser actuator with a clamp, the clamp being configured to hold the electrical heating element, the outer body, and the flow insert in axial compression against the jet dispenser actuator.

5. The method of claim 1, further comprising:

configuring the outer body to include an upper surface configured to receive an insert shaft of the flow insert; and configuring the flow insert to include a lower surface, wherein maintaining the target temperature of the fluid material includes selectively controlling a power supply in response to a sensed temperature.

6. The method of claim 1 further comprising configuring the outer body to receive the fluid material and direct the fluid material into a helically-shaped fluid passage groove of the flow insert.

7. The method of claim 1 further comprising:

configuring the flow insert with an insert shaft to be removably received within an insert socket of the outer body such that the flow insert and the outer body define the fluid passage therebetween; and arranging the fluid passage to extend about and along the longitudinal axis of the outer body with a helical shape and/or a spiral shape.

8. The method of claim 1 further comprising configuring the outer body to receive heat from a heating element and transferring the heat to the fluid material flowing through a helically-shaped fluid passage groove of the fluid passage.

9. The method of claim 1 further comprising:

configuring the outer body to receive the fluid material and direct the fluid material into a helically-shaped fluid passage groove of the flow insert;

configuring the flow insert with an insert shaft to be removably received within an insert socket of the outer body;

arranging the fluid passage with a fluid passage groove to extend about and along the longitudinal axis of the outer body; and configuring the outer body to receive heat from a heating element and transferring the heat to the fluid material flowing through a helically-shaped fluid passage groove that defines the fluid passage.

10. The method of claim 1, further comprising arranging the fluid passage with a helically-shaped fluid passage groove to extend at least partially circumferentially about the longitudinal axis.

11. The method of claim 1, further comprising configuring the flow insert to include a helically-shaped groove at least partially defining the fluid passage.

12. The method of claim 1, further comprising:
configuring the flow insert to include an insert shaft;
configuring the outer body with an insert socket; and
configuring the fluid passage between the insert shaft of the flow insert and the insert socket of the outer body.

13. The method of claim 1, further comprising:
configuring the flow insert to include an insert shaft and the outer body to include an insert socket; and
configuring the flow insert and the outer body with a frictional connection such that the outer body releasably receives the flow insert.

14. The method of claim 13, further comprising:
configuring the outer body to include an upper surface configured to receive the insert shaft of the flow insert; and
configuring the flow insert to include a lower surface,
wherein the insert shaft is configured to be received in the insert socket of the outer body such that the lower surface of the flow insert contacts the upper surface of the outer body.

15. The method of claim 1, further comprising:
configuring a sealing element within a seal groove between the flow insert and the outer body, wherein the sealing element being configured to contain fluid material between the flow insert and the outer body.

16. The method of claim 1, further comprising:
configuring a heating element to peripherally surround the outer body, and the outer body directly contacts the heating element for receiving heat from the heating element,
configuring the outer body to transfer heat to the fluid material in a helically- shaped fluid passage groove of the flow insert, and
energizing the heating element with a power supply controllable to achieve a target temperature of the fluid material flowing through the fluid passage.

17. The method of claim 1, further comprising:
configuring the outer body to include an annular shoulder that directly contacts a heating element for receiving heat from the heating element; and
configuring the outer body to transfer heat to the fluid material in a helically- shaped fluid passage groove of the flow insert.

18. The method of claim 1, further comprising:
configuring the outer body and the flow insert to be maintained in axial engagement by a heating element, configuring the outer body to receive heat from the heating element and transfer the heat to the fluid material flowing through a helically-shaped fluid passage groove that defines the fluid passage and configuring the jet cartridge to be releasably coupleable to a jet dispenser actuator via the heating element.

19. The method of claim 1, further comprising:
configuring the outer body to receive the fluid material and direct the fluid material into a helically-shaped fluid passage groove of the flow insert; and
configuring a valve member having a valve stem tip to contact a valve seat to jet heated fluid material through the nozzle, the valve stem tip being disposed within the flow insert.

20. The method of claim 1, further comprising:
configuring the outer body to include an upper-a-surface configured to receive an insert shaft of the flow insert; and
configuring a frictional connection between the outer body and the flow insert with a sealing element within a seal groove between the flow insert and the outer body,
wherein the frictional connection being configured to be disengaged for exposing the fluid passage without use of an independent tool.

* * * * *